US008421729B2

(12) United States Patent
Lee

(10) Patent No.: US 8,421,729 B2
(45) Date of Patent: Apr. 16, 2013

(54) LIQUID CRYSTAL DISPLAY AND DRIVING METHOD THEREOF

(75) Inventor: Ju Young Lee, Yeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 834 days.

(21) Appl. No.: 11/899,577

(22) Filed: Sep. 5, 2007

(65) Prior Publication Data

US 2008/0143754 A1 Jun. 19, 2008

(30) Foreign Application Priority Data

Dec. 19, 2006 (KR) ........................ 10-2006-0130052

(51) Int. Cl.
*G09G 3/36* (2006.01)
*G09G 5/00* (2006.01)
*G09G 5/10* (2006.01)
*G06F 3/038* (2006.01)

(52) U.S. Cl.
USPC ............. 345/96; 345/204; 345/690; 345/209; 345/89

(58) Field of Classification Search .................. 345/204, 345/690, 209, 87–104
See application file for complete search history.

(56) References Cited

U.S. PATENT DOCUMENTS

2003/0137526 A1* 7/2003 Sakaguchi .................... 345/690
2005/0078069 A1* 4/2005 Aiba et al. ....................... 345/87
2006/0114207 A1* 6/2006 Lee et al. ......................... 345/89
2006/0238473 A1* 10/2006 Hashimoto ..................... 345/89

FOREIGN PATENT DOCUMENTS

JP 06-348235 12/1994
JP 07-121144 5/1995
JP 2005-031609 2/2005
JP 2006-039205 2/2006
JP 2006-058891 3/2006

OTHER PUBLICATIONS

Office Action issued in corresponding Japanese Patent Application No. 2007-261545, mailed Jun. 20, 2011.
Office Action issued in corresponding Japanese Patent Application No. 2007-261545, mailed Aug. 2, 2012.

* cited by examiner

*Primary Examiner* — Bipin Shalwala
*Assistant Examiner* — Ilana Spar
(74) *Attorney, Agent, or Firm* — Brinks Hofer Gilson & Lione

(57) ABSTRACT

A liquid crystal display for automatically adjusting a swing of a gamma reference voltage which is used for determining a gray scale level of a frame that is driven with a doubled frame frequency in real time is disclosed.

In the liquid crystal display, a frequency converter doubles a frame frequency of an inputted frame to generate a doubled odd numbered frame and a doubled even numbered frame. A timing controller generates a gamma swing control signal which controls a swing of a gamma reference voltage which is used for determining gray scale levels of the doubled odd numbered frame and the doubled even numbered frame. And a gamma reference voltage generator generates first gamma reference voltages having a different level corresponding to a high gray scale and second gamma reference voltages having a different level corresponding to a low gray scale, and the gamma reference voltage generator inversely swings the first gamma reference voltages of high gray scale and the second gamma reference voltages of low gray scale in accordance with the gamma swing control signal for a driving period of the doubled odd numbered frame and inversely swings the first gamma reference voltages of high gray scale and the second gamma reference voltages of low gray scale in accordance with the gamma swing control signal for a driving period of the doubled even numbered frame.

6 Claims, 16 Drawing Sheets

LIQUID CRYSTAL DISPLAY AND DRIVING METHOD THEREOF

This application claims the benefit of Korean Patent Application No. P2006-130052 filed in Korea on Dec. 19, 2006, which is hereby incorporated by reference.

BACKGROUND OF THE INVENTION

1. Field of the Invention

The present invention relates to a liquid crystal display, and more particularly to a liquid crystal display that is adaptive for automatically adjusting a swing of a gamma reference voltage which is used for determining a gray scale level of a frame that is driven with a doubled frame frequency in real time, and a driving method thereof.

2. Description of the Related Art

Generally, a liquid crystal display controls light transmittance of liquid crystal cells in accordance with video signals to thereby display a picture. An active matrix type of liquid crystal display having a switching device provided for each liquid crystal cell is advantageous for an implementation of moving picture because it permits an active control of the switching device. The switching device used for the active matrix liquid crystal display mainly employs a thin film transistor (hereinafter, referred to as "TFT") as shown in FIG. 1.

Referring to FIG. 1, the liquid crystal display of the active matrix type converts a digital input data into an analog data voltage on the basis of a gamma reference voltage to supply it to a data line DL and, at the same time supply a scanning pulse to a gate line GL, thereby charging a liquid crystal cell Clc.

A gate electrode of the TFT is connected to the gate line GL, a source electrode is connected to the data line DL, and a drain electrode of the TFT is connected to a pixel electrode of the liquid crystal cell Clc and one end electrode of a storage capacitor Cst.

A common electrode of the liquid crystal cell Clc is supplied with a common voltage Vcom.

When the TFT is turned-on, the storage capacitor Cst charges a data voltage applied from the data line DL to constantly maintain a voltage of the liquid crystal cell Clc.

If the gate pulse is applied to the gate line GL, the TFT is turned-on to define a channel between the source electrode and the drain electrode, thereby supplying a voltage on the data line DL to the pixel electrode of the liquid crystal cell Clc. In this case, liquid crystal molecules of the liquid crystal cell Clc are arranged by an electric field between the pixel electrode and the common electrode to modulate an incident light.

A configuration of a liquid crystal display of a related art including pixels which have such a structure is the same as shown in FIG. 2.

FIG. 2 is a block diagram showing a configuration of a liquid crystal display of the related art.

Referring to FIG. 2, the liquid crystal display device 100 of the related art includes a liquid crystal display panel 110, a data driver 120, a gate driver 130, a gamma reference voltage generator 140, a backlight assembly 150, an inverter 160, a common voltage generator 170, a gate driving voltage generator 180, and a timing controller 190. Herein, the data driver 120 supplies a data to the data lines DL1 to DLm of the liquid crystal display panel 110. The gate driver 130 supplies a scanning pulse to the gate lines GL1 to GLn of the liquid crystal display panel 110. The gamma reference voltage generator 140 generates a gamma reference voltage to supply it to the data driver 120. The backlight assembly 150 irradiates a light onto the liquid crystal display panel 110. The inverter 160 applies an AC voltage and a current to the backlight assembly 150. The common voltage generator 170 generates a common voltage Vcom to supply it to the common electrode of the liquid crystal cell Clc of the liquid crystal display panel 110. The gate driving voltage generator 180 generates a gate high voltage VGH and a gate low voltage VGL to supply them to the gate driver 130. The timing controller 190 controls the data driver 120 and the gate driver 130.

The liquid crystal display panel 110 has a liquid crystal dropped between two glass substrates. On the lower glass substrate of the liquid crystal display panel 110, the data lines DL1 to DLm and the gate lines GL1 to GLn perpendicularly cross each other. Each intersection between the data lines DL1 to DLm and the gate lines GL1 to GLn is provided with the TFT. The TFT supplies a data on the data lines DL1 to DLm to the liquid crystal cell Clc in response to the scanning pulse. The gate electrode of the TFT is connected to the gate lines GL1 to GLn while the source electrode thereof is connected to the data line DL1 to DLm. Further, the drain electrode of the TFT is connected to the pixel electrode of the liquid crystal cell Clc and to the storage capacitor Cst.

The TFT is turned-on in response to the scanning pulse which is applied, via gate lines GL1 to GLn, to the gate terminal. Upon turning-on of the TFT, a video data on the data line DL1 to DLm is supplied to the pixel electrode of the liquid crystal cell Clc.

The data driver 120 supplies a data to the data lines DL1 to DLm in response to a data driving control signal DDC which is supplied from the timing controller 190. Further, the data driving circuit 120 samples and latches digital video data RGB which are supplied from the timing controller 190, and then converts them into an analog data voltage that is capable of realizing a gray scale at the liquid crystal cell Clc of the liquid crystal display panel 110 on the basis of a gamma reference voltage which is supplied from the gamma reference voltage generator 140 to supply it to the data lines DL1 to DLm.

The gate driver 130 sequentially generates a scanning pulse in response to a gate driving control signal GDC and a gate shift clock GSC which are supplied from the timing controller 190 to supply them to the gate lines GL1 to GLn. In this case, the gate driver 130 determines a high level voltage and a low level voltage of the scanning pulse in accordance with the gate high voltage VGH and the gate low voltage VGL which are supplied from the gate driving voltage generator 180.

The gamma reference voltage generator 140 receives a high-level power voltage VDD to generate a positive gamma reference voltage and a negative gamma reference voltage to output them to the data driver 120.

The backlight assembly 150 is provided at the rear side of the liquid crystal display panel 110, and is radiated by an AC voltage and a current which are supplied from the inverter 160 to irradiate a light onto each pixel of the liquid crystal display panel 110.

The inverter 160 converts a square wave signal generated at the interior thereof into a triangular wave signal, and then compares the triangular wave signal with a direct current power voltage VCC supplied from the system to generate a burst dimming signal proportional to the result. If the burst dimming signal is generated, then a driving integrated circuit IC (not shown) within the inverter 160 controls a generation of AC voltage and current supplied to the backlight assembly 150 in accordance with the burst dimming signal.

The common voltage generator 170 receives a high-level power voltage VDD to generate a common voltage Vcom, and supplies it to the common electrode of the liquid crystal cells Clc provided at each pixel of the liquid crystal display panel 110.

The gate driving voltage generator 180 is supplied with a high-level power voltage VDD to generate the gate high voltage VGH and the gate low voltage VGL, and supplies them to the gate driver 130. Herein, the gate driving voltage generator 180 generates a gate high voltage VGH more than a threshold voltage of the TFT provided at each pixel of the liquid crystal display panel 110 and a gate low voltage VGL less then the threshold voltage of the TFT. The gate high voltage VGH and the gate low voltage VGL generated in this manner are used for determining a high level voltage and a low level voltage of the scanning pulse generated by the gate driver 130, respectively.

The timing controller 190 supplies digital video data RGB which are supplied from a system such as a TV set or a computer monitor, etc to the data driver 120. Furthermore, the timing controller 190 generates a data driving control signal DCC and a gate driving control signal GDC using horizontal/vertical synchronization signals H and V from a system in response to a clock signal CLK from a system to supply them to the data driver 120 and the gate driver 130, respectively. Herein, the data driving control signal DDC includes a source shift clock SSC, a source start pulse SSP, a polarity control signal POL, and a source output enable signal SOE, etc. The gate driving control signal GDC includes a gate start pulse GSP and a gate output enable signal GOE, etc.

In general, the liquid crystal display 100 of the related art having such a configuration and a function is driven with a frame frequency of 60 Hz. However, in order to improve a motion blur, a technique that a liquid crystal display is driven with a frame frequency of 120 Hz has been developed recently.

When the liquid crystal display of the related art is driven with a frame frequency of 120 Hz, the gamma reference voltage generator 140 generates a plurality of gamma reference voltages GMA1 to GMA14 that have a different level to supply them to the data driver 120 as shown in FIG. 3. Herein, a plurality of gamma reference voltages GMA1 to GMA14 which are being supplied to a doubled odd numbered frame and a doubled even numbered frame maintain a constant level without a swing as shown in FIG. 3.

Since levels of the gamma reference voltages GMA1 to GMA14 are constantly maintained, a doubled odd numbered frame and a doubled even numbered frame of which a gray scale is realized proportional to levels of the gamma reference voltages GMA1 to GMA14 have a gray scale converting characteristics as shown in FIG. 4.

FIG. 4 is a diagram showing a gray scale converting characteristics of the liquid crystal display of the related art which is driven with a doubled frame frequency. In other words, FIG. 4 shows a gray scale converting characteristics in a normally black mode which displays a black screen in a normally state that a data voltage is not applied to the liquid crystal display panel 110 and shows a gray scale converting characteristics in a normally white mode which displays a white screen in a normally state that a data voltage is not applied to the liquid crystal display panel 110.

Referring to FIG. 4, levels of the gamma reference voltages GMA1 to GMA7 corresponding to a high gray scale and levels of the gamma reference voltages GMA8 to GMA14 corresponding to a low gray scale are changed in symmetrical to each other, and gray scales which are realized in proportional to the levels are changed in symmetrical to each other on the basis of an intermediate gray scale at a doubled odd numbered frame and a doubled even numbered frame.

As described above, the liquid crystal display of the related art does not swing the gamma reference voltages GMA1 to GMA14, and doubles only a frame frequency upon doubling and driving of a frame. As a result, in the liquid crystal display of the related art, a flicker is generated by an alternate realization of a high gray scale and a low gray scale.

SUMMARY OF THE INVENTION

The present invention is to solve the above-mentioned problem. Accordingly, it is an object of the present invention to provide a liquid crystal display that is adaptive for automatically adjusting a swing of a gamma reference voltage which is used for determining a gray scale level of a frame that is driven with a doubled frame frequency in real time, and a driving method thereof.

It is another object of the present invention to provide a liquid crystal display that is adaptive for automatically adjusting a swing of a gamma reference voltage which is used for determining a gray scale level of a frame that is driven with a doubled frame frequency in real time to fast a motion picture response time MPRT upon driving of a frame frequency, and a driving method thereof.

It is another object of the present invention to provide a liquid crystal display that is adaptive for fasting a motion picture response time to remove a flicker which is generated by a driving of a frame frequency.

In order to achieve these and other objects of the invention, a liquid crystal display comprises a frequency converter that doubles a frame frequency of an inputted frame to generate a doubled odd numbered frame and a doubled even numbered frame; a timing controller that generates a gamma swing control signal which controls a swing of a gamma reference voltage which is used for determining gray scale levels of the doubled odd numbered frame and the doubled even numbered frame; and a gamma reference voltage generator that generates first gamma reference voltages having a different level corresponding to a high gray scale and second gamma reference voltages having a different level corresponding to a low gray scale, and the gamma reference voltage generator inversely swings the first gamma reference voltages of high gray scale and the second gamma reference voltages of low gray scale in accordance with the gamma swing control signal for a driving period of the doubled odd numbered frame and inversely swings the first gamma reference voltages of high gray scale and the second gamma reference voltages of low gray scale in accordance with the gamma swing control signal for a driving period of the doubled even numbered frame, and wherein the first gamma reference voltages of high gray scale and the second gamma reference voltages of low gray scale are inversely swung for driving periods of the doubled odd numbered frame and the doubled even numbered frame.

In the liquid crystal display, the gamma reference voltage generator includes an inverter that inverses the gamma swing control signal which is supplied from the timing controller.

In the liquid crystal display, the timing controller supplies a gamma swing control signal having a low level to the gamma reference voltage generator for a driving period of the doubled odd numbered frame, and then supplies a gamma swing control signal having a high level to the gamma reference voltage generator for a driving period of the doubled even numbered frame.

In the liquid crystal display, the gamma reference voltage generator decreases levels of the first gamma reference voltages having a high gray scale in accordance with the gamma swing control signal having a low level which is directly supplied from the timing controller and, at the same time increases levels of the second gamma reference voltages having a low gray scale in accordance with a gamma swing control signal having a high level which is inversed by the inverter for a driving period of the doubled odd numbered frame.

In the liquid crystal display, the gamma reference voltage generator increases levels of the first gamma reference voltages having a high gray scale in accordance with the gamma swing control signal having a high level which is directly supplied from the timing controller and, at the same time decreases levels of the second gamma reference voltages having a low gray scale in accordance with a gamma swing control signal having a low level which is inversed by the inverter for a driving period of the doubled even numbered frame.

In the liquid crystal display, the timing controller supplies a gamma swing control signal having a high level to the gamma reference voltage generator for a driving period of the doubled odd numbered frame, and then supplies a gamma swing control signal having a low level to the gamma reference voltage generator for a driving period of the doubled even numbered frame.

In the liquid crystal display, the gamma reference voltage generator increases levels of the first gamma reference voltages having a high gray scale in accordance with the gamma swing control signal having a high level which is directly supplied from the timing controller and, at the same time decreases levels of the second gamma reference voltages having a low gray scale in accordance with a gamma swing control signal having a low level which is inversed by the inverter for a driving period of the doubled odd numbered frame.

In the liquid crystal display, the gamma reference voltage generator decreases levels of the first gamma reference voltages having a high gray scale in accordance with the gamma swing control signal having a low level which is directly supplied from the timing controller and, at the same time increases levels of the second gamma reference voltages having a low gray scale in accordance with a gamma swing control signal having a high level which is inversed by the inverter for a driving period of the doubled even numbered frame.

A method of driving a liquid crystal display according to an embodiment of the present invention comprises doubling a frame frequency of an inputted frame to generate a doubled odd numbered frame and a doubled even numbered frame; generating a gamma swing control signal which controls a swing of a gamma reference voltage which is used for determining gray scale levels of the doubled odd numbered frame and the doubled even numbered frame; and generating first gamma reference voltages having a different level corresponding to a high gray scale and second gamma reference voltages having a different level corresponding to a low gray scale, and in the step of generating the gamma reference voltage, the first gamma reference voltages of high gray scale and the second gamma reference voltages of low gray scale are inversely swung in accordance with the gamma swing control signal for a driving period of the doubled odd numbered frame and the first gamma reference voltages of high gray scale and the second gamma reference voltages of low gray scale are inversely swung in accordance with the gamma swing control signal for a driving period of the doubled even numbered frame, and wherein the first gamma reference voltages of high gray scale and the second gamma reference voltages of low gray scale are inversely swung for driving periods of the doubled odd numbered frame and the doubled even numbered frame.

In the method, the step of generating the gamma reference voltage includes inversing the gamma swing control signal which is supplied from the timing controller.

In the method, the step of generating the gamma swing control signal generates a gamma swing control signal having a low level for a driving period of the doubled odd numbered frame, and then generates a gamma swing control signal having a high level for a driving period of the doubled even numbered frame.

In the method, the step of generating the gamma reference voltage decreases levels of the first gamma reference voltages having a high gray scale in accordance with the generated gamma swing control signal having a low level and, at the same time increases levels of the second gamma reference voltages having a low gray scale in accordance with a gamma swing control signal having a high level that the generated gamma swing control signal having a low level is inversed for a driving period of the doubled odd numbered frame.

In the method, the step of generating the gamma reference voltage increases levels of the first gamma reference voltages having a high gray scale in accordance with the generated gamma swing control signal having a high level and, at the same time decreases levels of the second gamma reference voltages having a low gray scale in accordance with a gamma swing control signal having a low level that the generated gamma swing control signal having a high level is inversed for a driving period of the doubled even numbered frame.

In the method, the step of generating the gamma swing control signal generates a gamma swing control signal having a high level for a driving period of the doubled odd numbered frame, and then generates a gamma swing control signal having a low level for a driving period of the doubled even numbered frame.

In the method, the step of generating the gamma reference voltage increases levels of the first gamma reference voltages having a high gray scale in accordance with the generated gamma swing control signal having a high level and, at the same time decreases levels of the second gamma reference voltages having a low gray scale in accordance with a gamma swing control signal having a low level that the generated gamma swing control signal having a high level is inversed for a driving period of the doubled odd numbered frame.

In the method, the step of generating the gamma reference voltage decreases levels of the first gamma reference voltages having a high gray scale in accordance with the generated gamma swing control signal having a low level and, at the same time increases levels of the second gamma reference voltages having a low gray scale in accordance with a gamma swing control signal having a high level that the generated gamma swing control signal having a low level is inversed for a driving period of the doubled even numbered frame.

A liquid crystal display according to another embodiment of the present invention comprises a frequency converter that doubles a frame frequency of an inputted frame to generate a doubled odd numbered frame and a doubled even numbered frame; a timing controller that generates a gamma swing control signal which controls a swing of a gamma reference voltage which is used for determining gray scale levels of the doubled odd numbered frame and the doubled even numbered frame; and a gamma reference voltage generator that generates first gamma reference voltages having a different level corresponding to a high gray scale and second gamma reference voltages having a different level corresponding to a low gray scale, and the gamma reference voltage generator uniformly swings the first gamma reference voltages of high gray scale and the second gamma reference voltages of low gray scale in accordance with the gamma swing control signal for a driving period of the doubled odd numbered frame and uniformly swings the first gamma reference voltages of high gray scale and the second gamma reference voltages of low gray scale in accordance with the gamma swing control signal for a driving period of the doubled even numbered frame, and wherein the first gamma reference voltages of high gray scale and the second gamma reference voltages of low gray scale are inversely swung for driving periods of the doubled odd numbered frame and the doubled even numbered frame.

In the liquid crystal display, the gamma reference voltage generator includes an inverter that inverses the gamma swing control signal which is supplied from the timing controller.

In the liquid crystal display, the timing controller supplies a gamma swing control signal having a low level to the gamma reference voltage generator for a driving period of the doubled odd numbered frame, and then supplies a gamma swing control signal having a high level to the gamma reference voltage generator for a driving period of the doubled even numbered frame.

In the liquid crystal display, the gamma reference voltage generator decreases levels of the first gamma reference voltages having a high gray scale and the second gamma reference voltages having a low gray scale in accordance with the gamma swing control signal having a low level which is directly supplied from the timing controller.

In the liquid crystal display, the gamma reference voltage generator increases levels of the first gamma reference voltages having a high gray scale and the second gamma reference voltages having a low gray scale in accordance with the gamma swing control signal having a high level which is directly supplied from the timing controller.

In the liquid crystal display, the timing controller supplies a gamma swing control signal having a high level to the gamma reference voltage generator for a driving period of the doubled odd numbered frame, and then supplies a gamma swing control signal having a low level to the gamma reference voltage generator for a driving period of the doubled even numbered frame.

In the liquid crystal display, the gamma reference voltage generator increases levels of the first gamma reference voltages having a high gray scale and the second gamma reference voltages having a low gray scale in accordance with the gamma swing control signal having a high level which is directly supplied from the timing controller.

In the liquid crystal display, the gamma reference voltage generator decreases levels of the first gamma reference voltages having a high gray scale and the second gamma reference voltages having a low gray scale in accordance with the gamma swing control signal having a low level which is directly supplied from the timing controller.

A method of driving a liquid crystal display according to an embodiment of the present invention comprises doubling a frame frequency of an inputted frame to generate a doubled odd numbered frame and a doubled even numbered frame; generating a gamma swing control signal which controls a swing of a gamma reference voltage which is used for determining gray scale levels of the doubled odd numbered frame and the doubled even numbered frame; and generating first gamma reference voltages having a different level corresponding to a high gray scale and second gamma reference voltages having a different level corresponding to a low gray scale, and in the step of generating the gamma reference voltage, the first gamma reference voltages of high gray scale and the second gamma reference voltages of low gray scale are uniformly swung in accordance with the gamma swing control signal for a driving period of the doubled odd numbered frame and the first gamma reference voltages of high gray scale and the second gamma reference voltages of low gray scale are uniformly swung in accordance with the gamma swing control signal for a driving period of the doubled even numbered frame, and wherein the first gamma reference voltages of high gray scale and the second gamma reference voltages of low gray scale are inversely swung for driving periods of the doubled odd numbered frame and the doubled even numbered frame.

In the method, the step of generating the gamma swing control signal generates a gamma swing control signal having a low level for a driving period of the doubled odd numbered frame, and then generates a gamma swing control signal having a high level for a driving period of the doubled even numbered frame.

In the method, the step of generating the gamma reference voltage decreases levels of the first gamma reference voltages having a high gray scale and the second gamma reference voltages having a low gray scale in accordance with the generated gamma swing control signal having a low level.

In the method, the step of generating the gamma reference voltage increases levels of the first gamma reference voltages having a high gray scale and the second gamma reference voltages having a low gray scale in accordance with the generated gamma swing control signal having a high level.

In the method, the step of generating the gamma swing control signal generates a gamma swing control signal having a high level for a driving period of the doubled odd numbered frame, and then generates a gamma swing control signal having a low level for a driving period of the doubled even numbered frame.

In the method, the step of generating the gamma reference voltage increases levels of the first gamma reference voltages having a high gray scale and the second gamma reference voltages having a low gray scale in accordance with the generated gamma swing control signal having a high level.

In the method, the step of generating the gamma reference voltage decreases levels of the first gamma reference voltages having a high gray scale and the second gamma reference voltages having a low gray scale in accordance with the generated gamma swing control signal having a low level.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Hereinafter, the preferred embodiments of the present invention will be described in detail with reference to the accompanying drawings.

Figure 1:
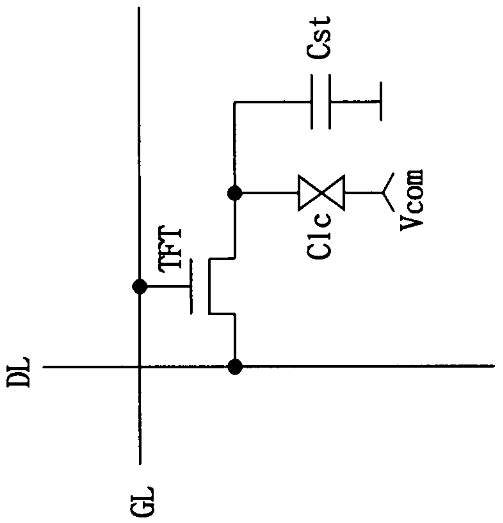
FIG. 1 RELATED ART
FIG. 1 is an equivalent circuit diagram showing a pixel provided at a liquid crystal display of the related art.
Figure 2:
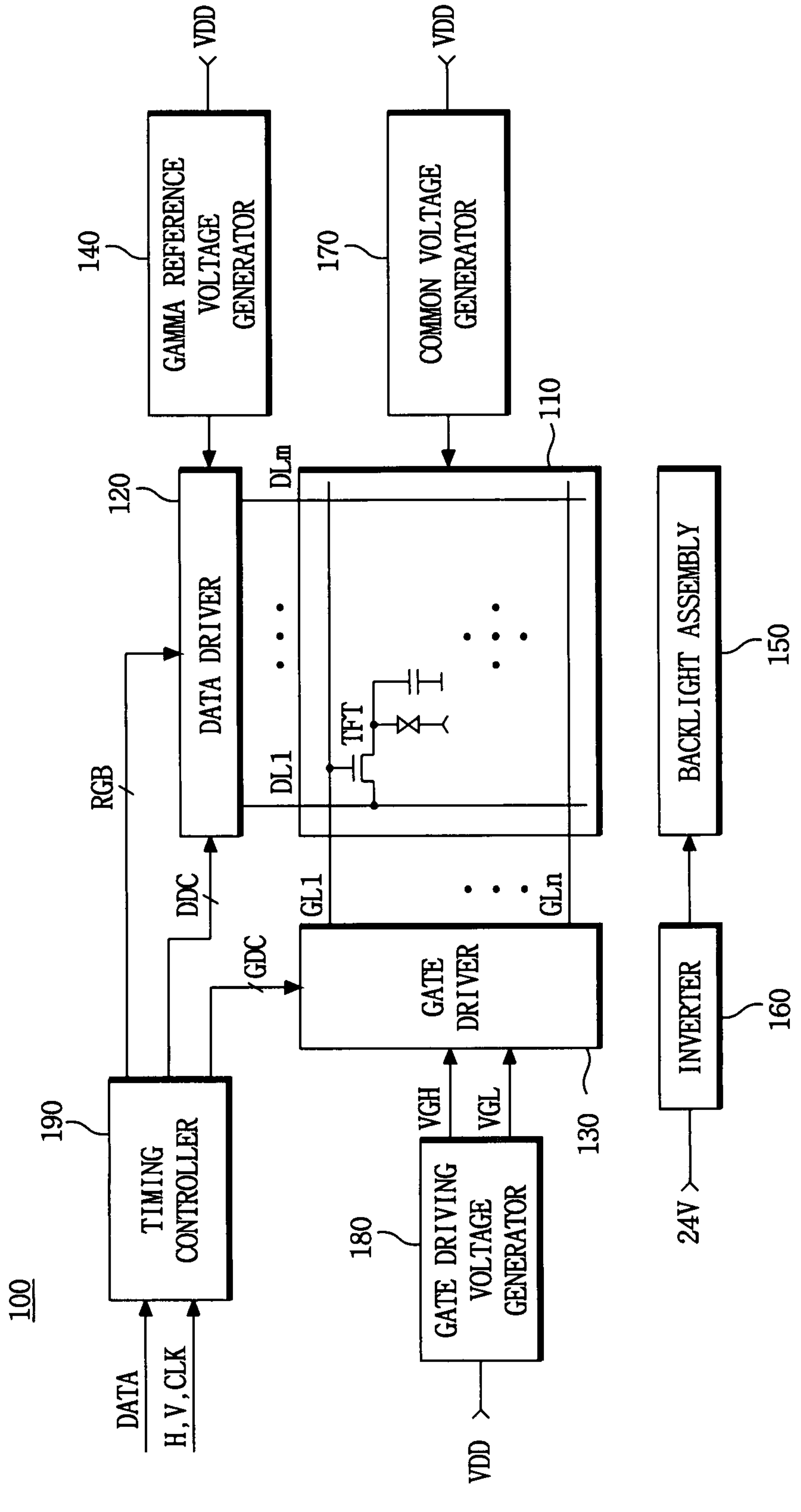
FIG.2 RELATED ART
FIG. 2 is a block diagram showing a configuration of the liquid crystal display of the related art.
Figure 3:
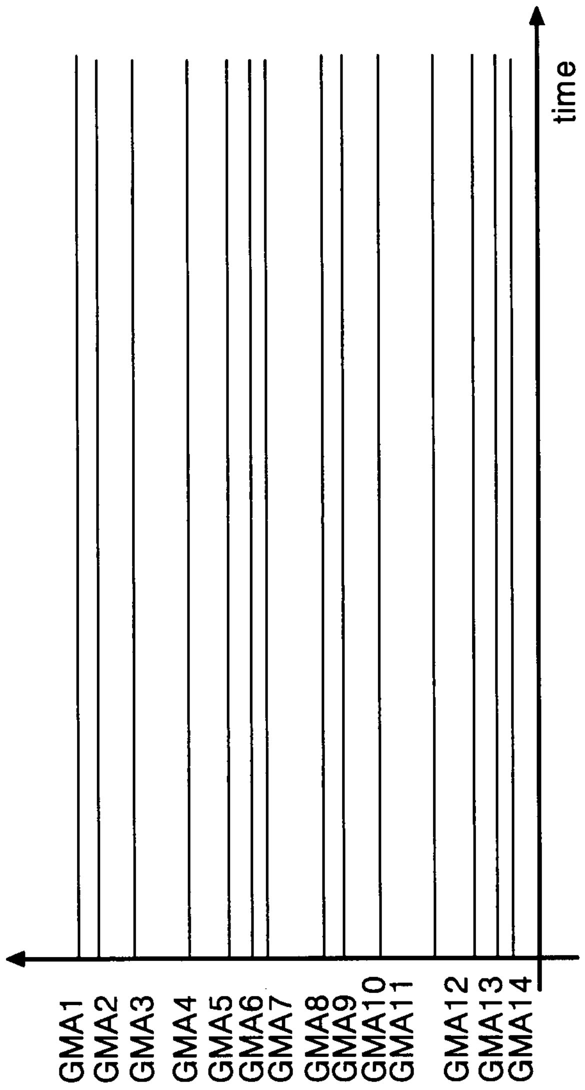
FIG.3 RELATED ART
FIG. 3 is a diagram showing a characteristics of a gamma reference voltage which is generated at the liquid crystal display of the related art.
Figure 4:
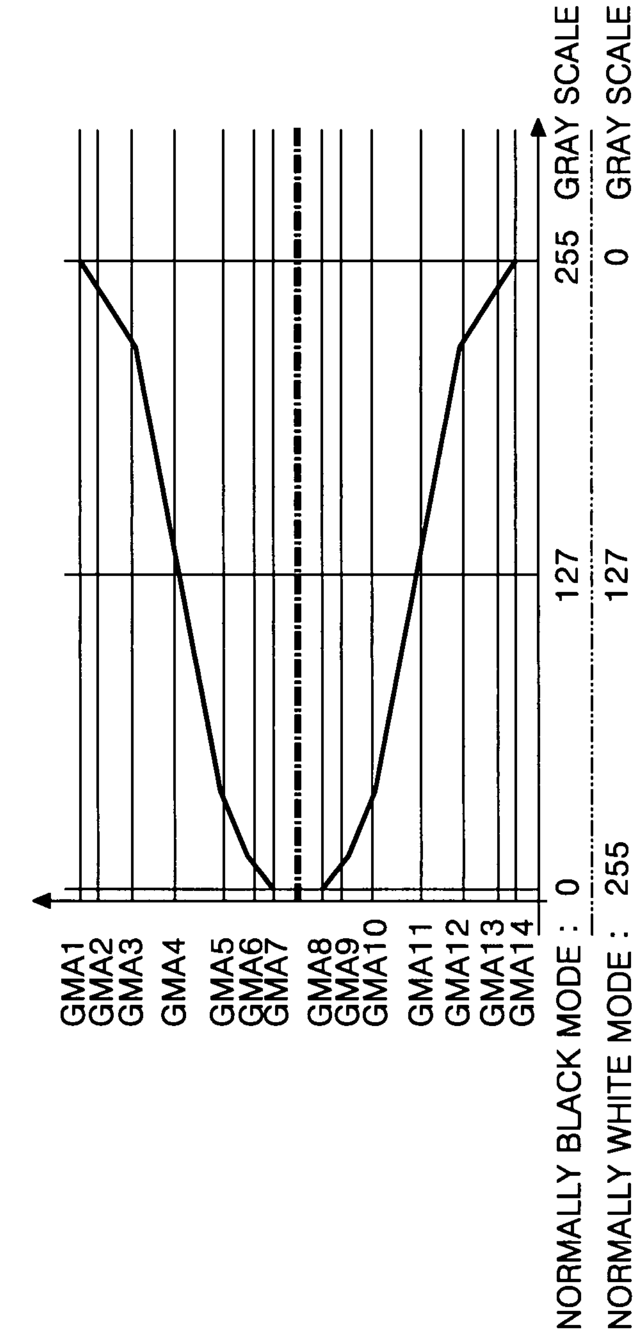
FIG.4 RELATED ART
FIG. 4 is a diagram showing a gray scale converting characteristics of the liquid crystal display of the related art which is driven with a doubled frame frequency.
Figure 5:
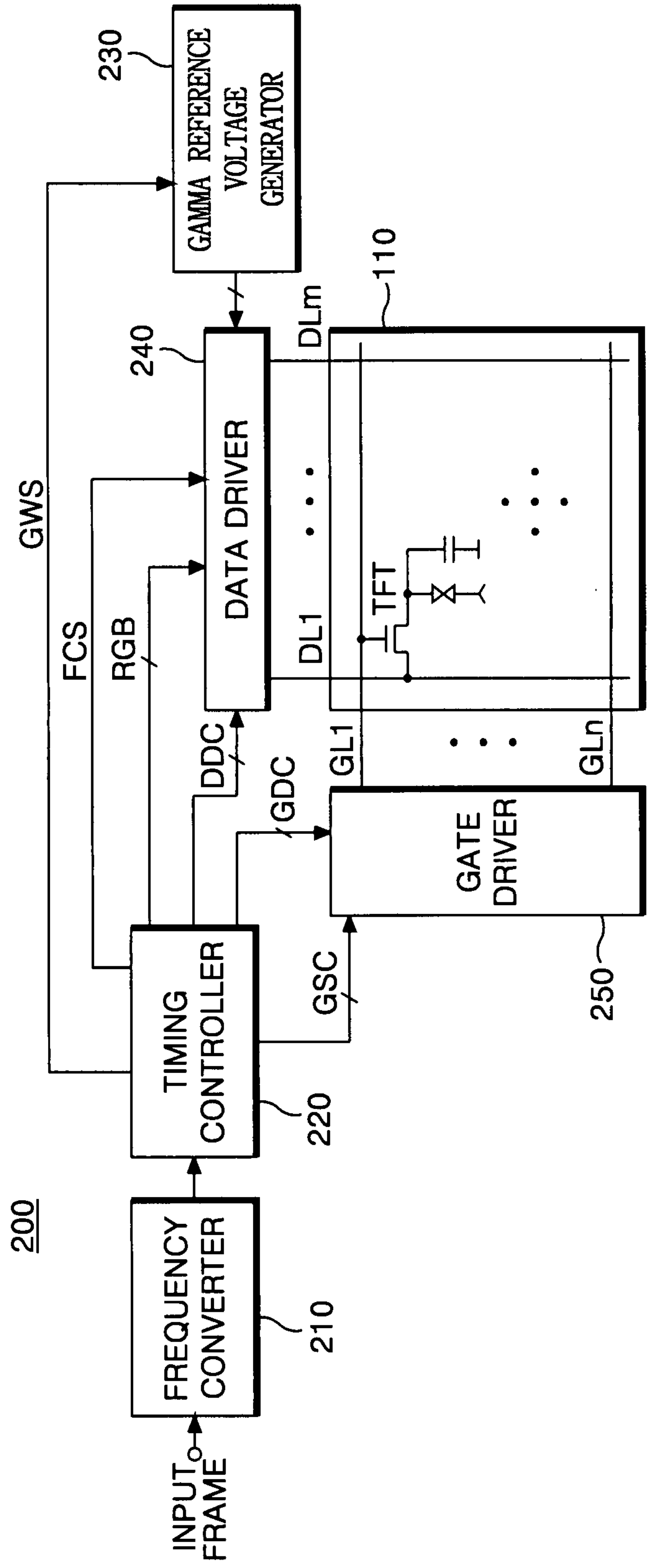
FIG. 5 is a diagram showing a configuration of a liquid crystal display according to an embodiment of the present invention.

FIG. 5 is a diagram showing a configuration of a liquid crystal display according to an embodiment of the present invention. Herein, a liquid crystal display 200 of the present invention includes the backlight assembly 150, the inverter 160, the common voltage generator 170, and the gate driving voltage generator 180 similar to the liquid crystal display 100 in FIG. 2. However, for the sake of explanation, the configurations will be omitted in FIG. 3.

Referring to FIG. 5, the liquid crystal display 200 of the present invention includes the liquid crystal display panel 110, a frequency converter 210, a timing controller 220, a gamma reference voltage generator 230, a data driver 240, and a gate driver 250. Herein, the frequency converter 210 doubles a frame frequency of an input frame to generate a doubled odd numbered frame and a doubled even numbered frame. The timing controller 220 controls driving timings of a doubled odd numbered frame and a doubled even numbered frame and generates a gamma swing control signal GWS which controls a swing of a gamma reference voltage which is used for determining gray scale levels of a doubled odd numbered frame and a doubled even numbered frame. The gamma reference voltage generator 230 swings first gamma reference voltages GMA1 to GMA5 and second gamma reference voltages GMA6 to GMA10 which are used for determining gray scale levels of a doubled odd numbered frame and a doubled even numbered frame in accordance with a gamma swing control signal GWS to supply them. The data driver 240 drives an odd numbered frame and an even numbered frame which are doubled by the frequency converter 210 in accordance with a frame driving control signal FCS from the timing controller 220 at the liquid crystal display panel and, at the same time realizes gray scales of doubled odd numbered frames and doubled even numbered frames proportional to levels of first gamma reference voltages GMA1 to GMA5 and second gamma reference voltages GMA6 to GMA10. The gate driver 250 sequentially generates a scanning pulse in response to a gate driving control signal which is supplied from the timing controller 220 to supply it to the gate lines GL1 to GLn.

The frequency converter 210 doubles a frame frequency of a frame which is inputted from a system to sequentially output a doubled odd numbered frame and a doubled even numbered frame to the timing controller 220 within a predetermined time. Herein, a doubled odd numbered frame and a doubled even numbered frame are the same frame.

Such a frequency converter 210 doubles a frame frequency by use of a dynamic data insertion DDI method. More specifically, the frequency converter 210 temporarily stores an inputted current frame, and then reads twice within a predetermined time to continuously output the same frames.

In the present invention, if a current frame is inputted from a system, the frequency converter 210 is realized to convert a first frame frequency of 60 Hz into a second frame frequency of 120 Hz. However, the frequency converter 210 is not limited to this. For example, the frequency converter 210 may be realized to convert a first frame frequency of 50 Hz into a second frame frequency of 60 Hz.

The timing controller 220 sequentially outputs a doubled odd numbered frame and a doubled even numbered frame which are doubled by the frequency converter 210 to the data driver 240 within a predetermined time and, at the same time supplies a frame driving control signal FCS to the data driver 240 to control a frame driving timing of the data driver 240. At the same time, the timing controller 220 generates a gamma swing control signal GWS which controls a swing of a gamma reference voltage which is used for determining gray scale levels of a doubled odd numbered frame and a doubled even numbered frame to supply it to the gamma reference voltage generator 230.

Furthermore, the timing controller 220 generates a data driving control signal DCC and a gate driving control signal GDC using horizontal/vertical synchronization signals H and V from a system in response to a clock signal CLK from a system to supply them to the data driver 240 and the gate driver 250, respectively. Herein, the data driving control signal DDC includes a source shift clock SSC, a source start pulse SSP, a polarity control signal POL, and a source output enable signal SOE, etc. The gate driving control signal GDC includes a gate start pulse GSP and a gate output enable signal GOE, etc.

The gamma reference voltage generator 230 generates a plurality of first gamma reference voltages GMA1 to GMA5 and a plurality of second gamma reference voltages GMA6 to GMA10 to supply them to the data driver 240. Herein, the gamma reference voltage generator 230 swings a plurality of first gamma reference voltages GMA1 to GMA5 and a plurality of second gamma reference voltages GMA6 to GMA10 in accordance with a gamma swing control signal GWS from the timing controller 220 to supply them. A swing of such a gamma reference voltage is realized by two methods which are described with reference to FIG. 7 and FIG. 10.

The data driver 240 sequentially drives a doubled odd numbered frame and a doubled even numbered frame to the liquid crystal display panel 110 in response to a frame driving control signal FCS from the timing controller 220 within a predetermined time. Furthermore, the data driver 240 converts data of a doubled odd numbered frame and a doubled even numbered frame into analog data voltages in response to a data driving control signal DDC from the timing controller 220 to supply them to the data lines DL1 to DLm. Herein, levels of the converted analog data voltages are the same as the levels of first gamma reference voltages GMA1 to GMA5 and second gamma reference voltages GMA6 to GMA10 which are supplied from the gamma reference voltage generator 230.

The gate driver 250 sequentially generates a scanning pulse in response to a gate driving control signal GDC and a gate shift clock GSC which are supplied from the timing controller 190 to supply them to the gate lines GL1 to GLn. Specially, the gate driver 250 sequentially supplies a scanning pulse to the gate lines GL1 to GLn during an odd numbered frame which is doubled by the frequency converter 210 is driven, and then sequentially supplies a scanning pulse to the gate lines GL1 to GLn during an even numbered frame which is re-doubled by the frequency converter 210 is driven.

Figure 6:
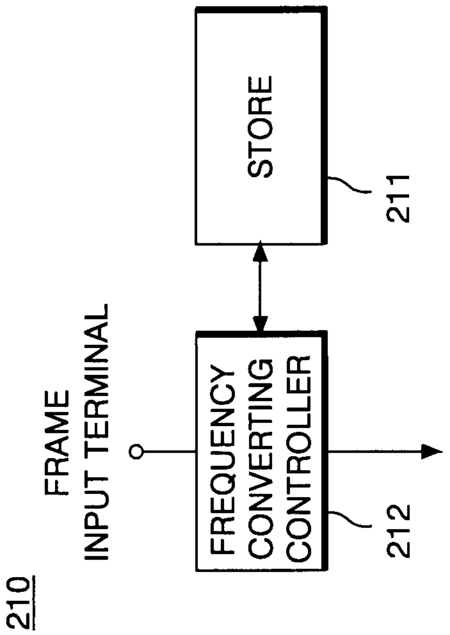
FIG. 6 is a diagram showing a configuration of the frequency converter in FIG. 5.

FIG. 6 is a diagram showing a configuration of the frequency converter in FIG. 5.

Referring to FIG. 6, the frequency converter 210 includes a store 211 and a frequency converting controller 212.

The store 211 is a memory which stores frame information, and may be realized in a virtual memory. Such a memory 211 temporarily stores a current frame which is written by the frequency converter 211.

If a current frame is inputted via a frame input terminal, the frequency converting controller 212 temporarily stores a current frame to the store 211, and then reads twice a frame of the store 211 within a predetermined time to sequentially output the read odd numbered frame and the read even numbered frame to the timing controller 220. In this way, the frequency converting controller 212 converts a first frame frequency into a second frame frequency.

Figure 7:
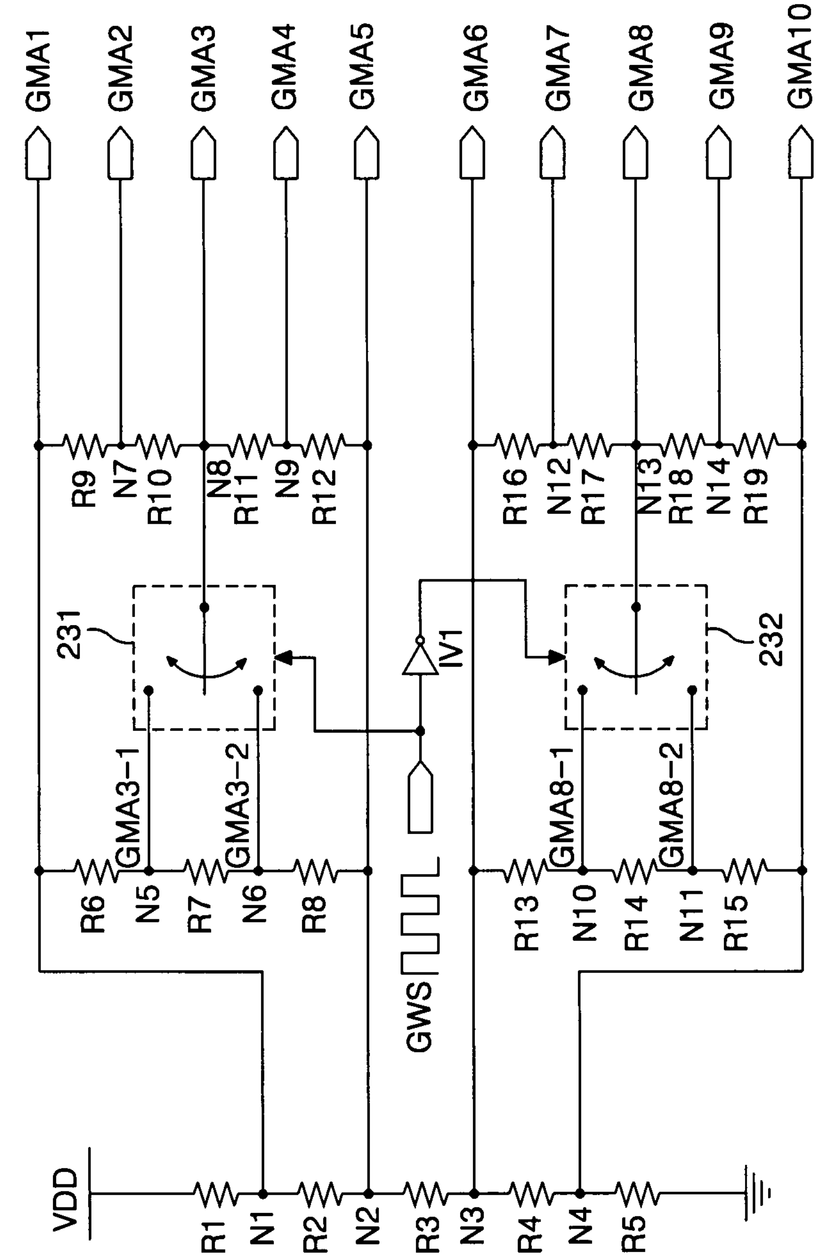
FIG. 7 is a circuit diagram showing an example of the gamma reference voltage generator in FIG. 5.

FIG. 7 is a circuit diagram showing an example of the gamma reference voltage generator in FIG. 5.

Referring to FIG. 7, the gamma reference voltage generator 230 includes a plurality of resistors R1 to R5 which are connected in series between a high-level power voltage source and a ground to which a high-level power voltage VDD is applied. Herein, a node N1 is located between the resistors R1 and R2, a node N2 is located between the resistors R2 and R3, a node N3 is located between the resistors R3 and R4, and a node N4 is located between the resistors R4 and R5.

The gamma reference voltage generator 230 includes resistors R6 to R8 and resistors R9 to R12. Herein, the resistors R6 to R8 are connected in series between the nodes N1 and N2. The resistors R9 to R12 are connected in series between the nodes N1 and N2 and are connected in parallel between the resistors R6 to R8. A node N5 is located between the resistors R6 and R7, a node N6 is located between the resistors R7 and R8, a node N7 is located between the resistors R9 and R10, a node N8 is located between the resistors R10 and R11, and a node N9 is located between the resistors R11 and R12.

The gamma reference voltage generator 230 includes resistors R13 to R15 and resistors R16 to R19. Herein, the resistors R13 to R15 are connected in series between the nodes N3 and N4. The resistors R16 to R19 are connected in series between the nodes N3 and N4 and are connected in parallel between the resistors R13 to R15. Anode N10 is located between the resistors R13 and R14, a node N11 is located between the resistors R14 and R15, a node N12 is located between the resistors R16 and R17, a node N13 is located between the resistors R17 and R18, and a node N14 is located between the resistors R18 and R19.

The gamma reference voltage generator 230 includes a switch 231, an inverter IV1, and a switch 232. Herein, the switch 231 has a switching direction which is adjusted in accordance with a level of a gamma swing control signal GWS from the timing controller 220. The inverter IV1 inverses a level of a gamma swing control signal GWS from the timing controller 220. The switch 232 has a switching direction which is adjusted in accordance with a level of a gamma swing control signal GWS which is inversed by the inverter IV1.

The resistors R1 to R5 divide a high-level power voltage VDD and a ground voltage to generate gamma reference voltages GMA1, GMA5, GMA6, and GMA10 via the nodes N1 to N4, respectively. A gamma reference voltage GMA1 which is generated via the node N1 is a voltage that a high-level power voltage VDD is dropped and divided by the resistor R1, and a gamma reference voltage GMA5 which is generated via the node N2 is a voltage that a voltage GMA1, which is applied to the node N1, is dropped and divided by the resistor R2. A gamma reference voltage GMA6 which is generated via the node N3 is a voltage that a voltage GMA5, which is applied to the node N2, is dropped and divided by the resistor R3, and a gamma reference voltage GMA10 which is generated via the node N4 is a voltage that a voltage GMA6, which is applied to the node N3 is dropped and divided by the resistor R4.

Since gamma reference voltages GMA1, GMA5, GMA6, and GMA10 are sequentially dropped and divided, a level is decreased in a sequence from the highest-level gamma reference voltage GMA1 toward the lowest-level gamma reference voltage GMA10. Accordingly, gamma reference voltages GMA5 and GMA6 become gamma reference voltages having an intermediate gray scale level, and gamma reference voltages GMA1 to GMA4 having a level higher than a gamma reference voltage GMA5 correspond to a high gray scale level and gamma reference voltages GMA7 to GMA10 having a level lower than a gamma reference voltage GMA6 correspond to a low gray scale level. However, a gamma reference voltage GMA3 may be set to have a level higher or lower than those of the others gamma reference voltages.

The resistors R6 to R8 divide gamma reference voltages GMA1 and GMA5 to generate gamma reference voltages GMA3-1 and GMA3-2 via the nodes N5 to N6, respectively. A gamma reference voltage GMA3-1 which is generated via the node N5 is a voltage that a gamma reference voltage GMA1 is dropped and divided by the resistor R6, and a gamma reference voltage GMA3-2 which is generated via the node N6 is a voltage that a voltage GMA3-1, which is applied to the node N5, is dropped and divided by the resistor R7. Thus, a level of a gamma reference voltage GMA3-1 is higher than that of a gamma reference voltage GMA3-2.

The resistors R9 to R12 divide gamma reference voltages GMA1 and GMA5 to generate gamma reference voltages GMA2, GMA3, and GMA4 via the nodes N7 to N9, respectively. A gamma reference voltage GMA2 which is generated via the node N7 is a voltage that a gamma reference voltage GMA1 is dropped and divided by the resistor R9, and a gamma reference voltage GMA4 which is generated via the node N9 is a voltage that a gamma reference voltage GMA3, which is applied to the node N8, is dropped and divided by the resistor R11. Furthermore, a gamma reference voltage GMA3 which is generated via the node N8 is the sum of a gamma reference voltage GMA3-1 or a gamma reference voltage GMA3-2 which is selectively outputted via the switch 231 and a voltage which is dropped and divided by the resistor R7. Accordingly, a level of a gamma reference voltage GMA3 is swung by a gamma reference voltage GMA3-1 or a gamma reference voltage GMA3-2 which is switched via the switch 231. Specially, a level of a gamma reference voltage GMA3 is relatively decreased in the case where a gamma reference voltage GMA3-2 is switched via the switch 231 than the case where a gamma reference voltage GMA3-1 is switched via the switch 231. On the contrary, a level of a gamma reference voltage GMA3 is relatively increased in the case where a gamma reference voltage GMA3-1 is switched via the switch 231 than the case where a gamma reference voltage GMA3-2 is switched via the switch 231.

The resistors R13 to R15 divide gamma reference voltages GMA6 and GMA10 to generate gamma reference voltages GMA8-1 and GMA8-2 via the nodes N10 to N11, respectively. A gamma reference voltage GMA8-1 which is generated via the node N10 is a voltage that a gamma reference voltage GMA6 is dropped and divided by the resistor R13, and a gamma reference voltage GMA8-2 which is generated via the node N11 is a voltage that a voltage GMA8-1, which is applied to the node N10, is dropped and divided by the resistor R14. Thus, a level of a gamma reference voltage GMA8-1 is higher than that of a gamma reference voltage GMA8-2.

The resistors R16 to R19 divide gamma reference voltages GMA6 and GMA10 to generate gamma reference voltages GMA7, GMA8, and GMA9 via the nodes N12 to N14, respectively. A gamma reference voltage GMA7 which is generated via the node N12 is a voltage that a gamma reference voltage GMA6 is dropped and divided by the resistor R16, and a gamma reference voltage GMA9 which is generated via the node N14 is a voltage that a gamma reference voltage GMA8, which is applied to the node N13, is dropped and divided by the resistor R13. Furthermore, a gamma reference voltage GMA8 which is generated via the node N13 is the sum of a gamma reference voltage GMA8-1 or a gamma reference voltage GMA8-2 which is selectively outputted via the switch 232 and a voltage which is dropped and divided by the resistor R17. Accordingly, a level of a gamma reference voltage GMA8 is swung by a gamma reference voltage GMA8-1 or a gamma reference voltage GMA8-2 which is switched via the switch 232. Specially, a level of a gamma reference voltage GMA8 is relatively decreased in the case where a gamma reference voltage GMA8-2 is switched via the switch 232 than the case where a gamma reference voltage GMA8-1 is switched via the switch 232. On the contrary, a level of a gamma reference voltage GMA8 is relatively increased in the case where a gamma reference voltage GMA8-1 is switched via the switch 232 than the case where a gamma reference voltage GMA8-2 is switched via the switch 232.

If a gamma swing control signal GWS having a low level is supplied from the timing controller 220, the switch 231 is switched in the node N6 direction to switch a gamma reference voltage GMA3-2. On the contrary, if a gamma swing control signal GWS having a high level is supplied from the timing controller 220, the switch 231 is switched in the node N5 direction to switch a gamma reference voltage GMA3-1.

The inverter IV1 inverses a gamma swing control signal GWS having a low level which is outputted from the timing controller 220 to supply a gamma swing control signal GWS having a high level to the switch 232, or inverses a gamma swing control signal GWS having a high level which is outputted from the timing controller 220 to supply a gamma swing control signal GWS having a low level to the switch 232.

If a gamma swing control signal GWS having a high level, which is inversed by the inverter IV1, is supplied, the switch 232 is switched in the node N10 direction to switch a gamma reference voltage GMA8-1. On the contrary, if a gamma swing control signal GWS having a low level, which is inversed by the inverter IV1, is supplied, the switch 232 is switched in the node N11 direction to switch a gamma reference voltage GMA8-2.

A method that the liquid crystal display which includes the gamma reference voltage generator having such configurations and functions according to the embodiment of the present invention swings a gamma reference voltage, will be described with reference to FIG. 8.

Figure 8:
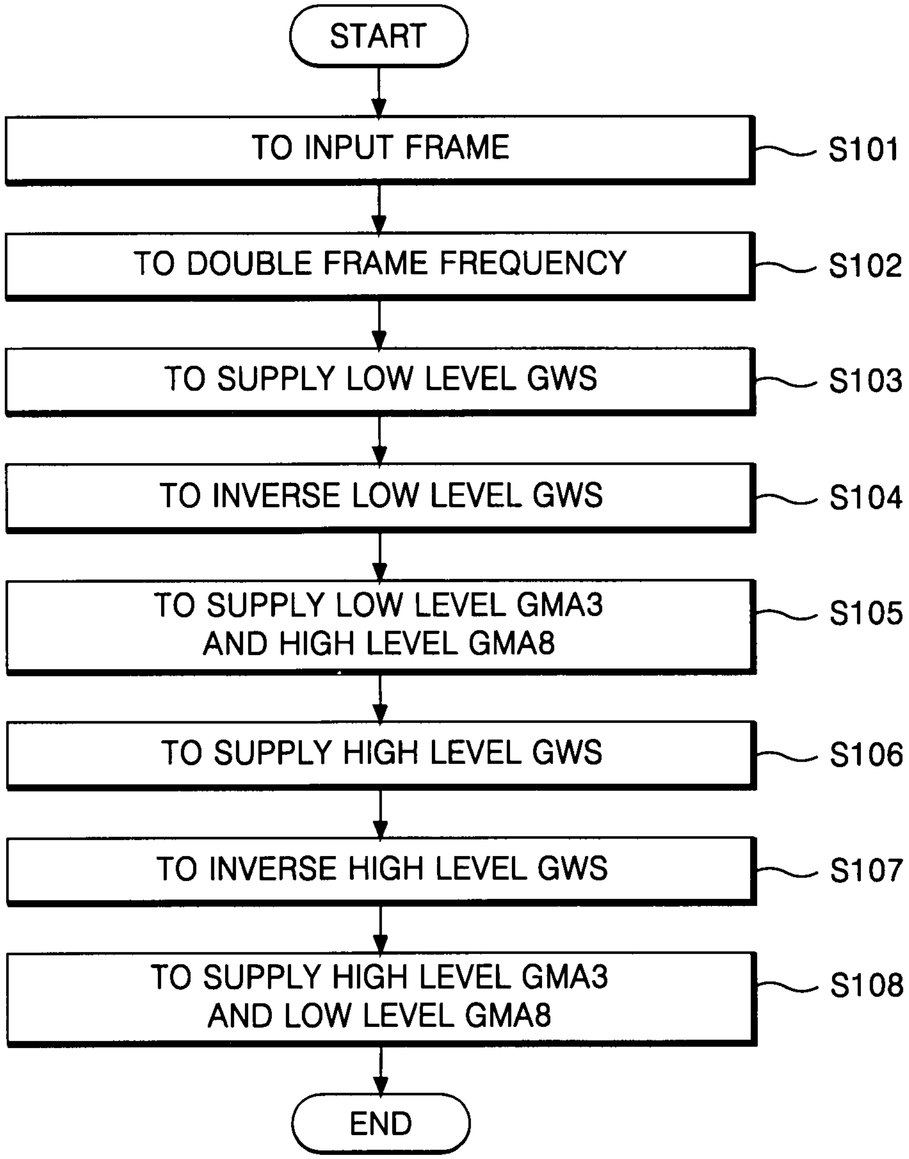
FIG. 8 is a flow chart showing a method of driving a liquid crystal display according to the embodiment of the present invention that includes the gamma reference voltage generator in FIG. 7.

FIG. 8 is a flow chart showing a method of supplying a gamma reference voltage of a liquid crystal display according to the embodiment of the present invention.

Referring to FIG. 8, if a frame is inputted from a system (S101), the frequency converter 210 doubles a frame frequency of an inputted frame to sequentially output a doubled odd numbered frame and a doubled even numbered frame to the timing controller 220 (S102).

If a frame frequency is doubled, the timing controller 220 supplies a gamma swing control signal GWS having a low level to the switch 231 of the gamma reference voltage generator 230 and the inverter IV1 for a driving period of a doubled odd numbered frame (S103). In this case, the inverter IV1 inverses a gamma swing control signal GWS having a low level to supply a gamma swing control signal GWS having a high level to the switch 232 (S104).

Figure 9:
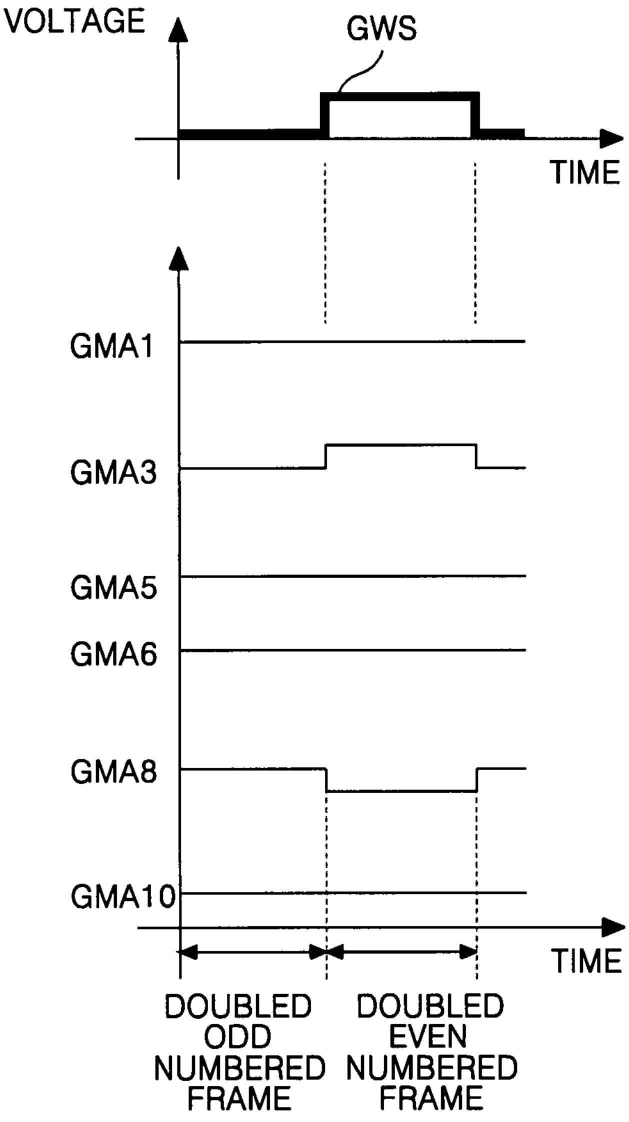
FIG. 9 is a diagram showing a characteristics of a gamma reference voltage which is outputted from the gamma reference voltage generator in FIG. 7.

For a driving period of a doubled odd numbered frame, the switch 231 is switched in the node N6 direction by a gamma swing control signal GWS having a low level to allow a gamma reference voltage GMA3 having a relative low level to supply to the data driver 240 as shown in FIG. 9. At the same time, the switch 232 is switched in the node N10 direction by a gamma swing control signal GWS having a high level to allow a gamma reference voltage GMA8 having a relative high level to supply to the data driver 240 as shown in FIG. 9 (S105).

If a driving period of a doubled odd numbered frame goes by, the timing controller 220 supplies a gamma swing control signal GWS having a high level to the switch 231 of the gamma reference voltage generator 230 and the inverter IV1 for a driving period of a doubled even numbered frame (S106). In this case, the inverter IV1 inverses a gamma swing control signal GWS having a high level to supply a gamma swing control signal GWS having a low level to the switch 232 (S107).

For a driving period of a doubled even numbered frame, the switch 231 is switched in the node N5 direction by a gamma swing control signal GWS having a high level to allow a gamma reference voltage GMA3 having a relative high level to supply to the data driver 240 as shown in FIG. 9. At the same time, the switch 232 is switched in the node N11 direction by a gamma swing control signal GWS having a low level to allow a gamma reference voltage GMA8 having a relative low level to supply to the data driver 240 as shown in FIG. 9 (S108).

A gamma reference voltage GMA3 that has a level between the highest-level gamma reference voltage GMA1 and a gamma reference voltage GMA5 having an intermediate gray scale level corresponds to a high gray scale level. On the contrary, a gamma reference voltage GMA8 that has a level between the lowest-level gamma reference voltage GMA10 and a gamma reference voltage GMA6 having an intermediate gray scale level corresponds to a low gray scale level.

In other words, the liquid crystal display according to the embodiment of the present invention relatively lowly swings levels of gamma reference voltages corresponding to a high gray scale and, at the same time relatively highly swings levels of gamma reference voltages corresponding to a low gray scale for a driving period of a doubled odd numbered frame. On the contrary, the liquid crystal display according to the embodiment of the present invention relatively highly swings levels of gamma reference voltages corresponding to a high gray scale and, at the same time relatively lowly swings levels of gamma reference voltages corresponding to a low gray scale for a driving period of a doubled even numbered frame.

In order to help a comprehension of the spirit of the present invention, in FIG. 7 and FIG. 8, the liquid crystal display of the present invention relatively lowly swings a level of a gamma reference voltage GMA3 corresponding to a high gray scale and, at the same time relatively highly swings a level of a gamma reference voltage GMA8 corresponding to a low gray scale for a driving period of a doubled odd numbered frame. On the contrary, the liquid crystal display of the present invention relatively highly swings a level of a gamma reference voltage GMA3 corresponding to a high gray scale and, at the same time relatively lowly swings a level of a gamma reference voltage GMA8 corresponding to a low gray scale for a driving period of a doubled even numbered frame.

Figure 10:
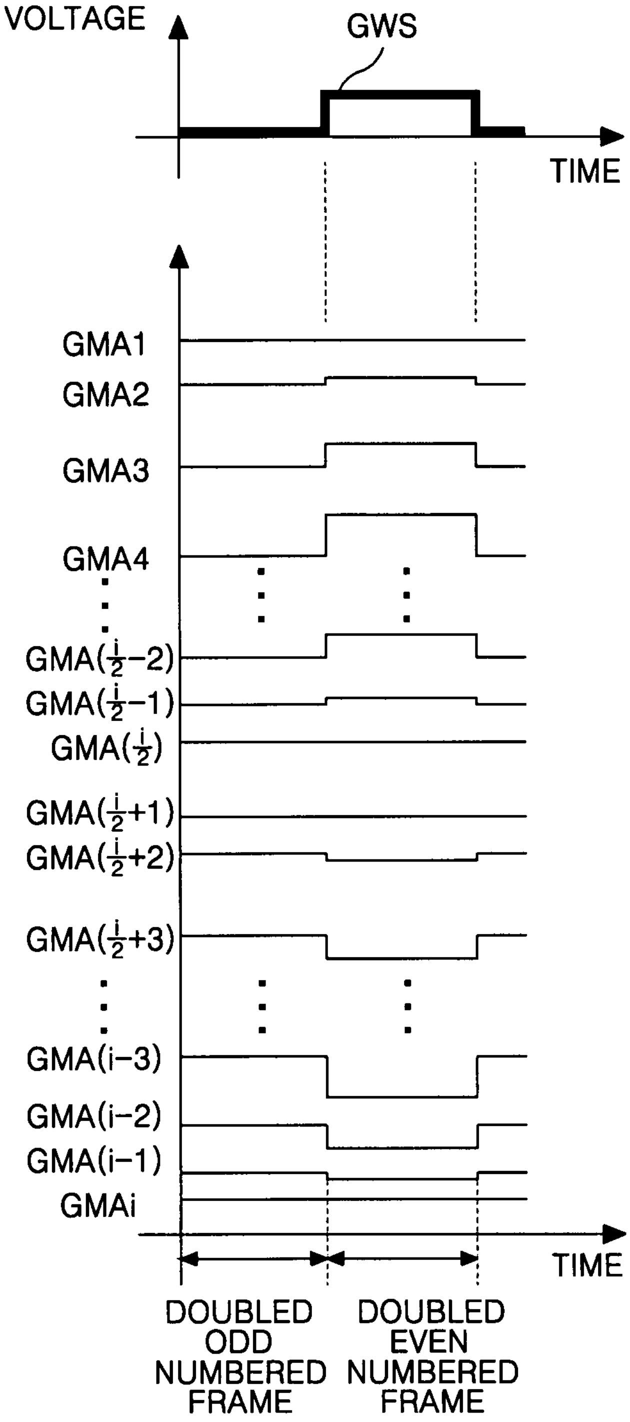
FIG. 10 is a diagram showing a characteristics of a gamma swing of the liquid crystal display according to the embodiment of the present invention.

More specifically, the liquid crystal display according to the embodiment of the present invention relatively lowly swings levels of gamma reference voltages GMA2 to GMA(i/2−1) corresponding to a high gray scale and, at the same time relatively highly swings levels of gamma reference voltages GMA(i/2−1) to GMA(i−1) corresponding to a low gray scale for a driving period of a doubled odd numbered frame as shown in FIG. 10. On the contrary, the liquid crystal display according to the embodiment of the present invention relatively highly swings levels of gamma reference voltages GMA2 to GMA(i/2−1) corresponding to a high gray scale and, at the same time relatively lowly swings levels of gamma reference voltages GMA(i/2−1) to GMA(i−1) corresponding to a low gray scale for a driving period of a doubled even numbered frame. Accordingly, the liquid crystal display according to the embodiment of the present invention improves a motion picture response time of the liquid crystal display which is driven with a doubled frame frequency to remove a flicker which is generated upon driving of a frame frequency.

However, the liquid crystal display according to the embodiment of the present invention does not swing the highest level gamma reference voltage GMA1, the lowest level gamma reference voltage GMAi, and gamma reference voltages GMA(i/2) and GMA(i/2+1) having an intermediate gray scale level.

Figure 11:
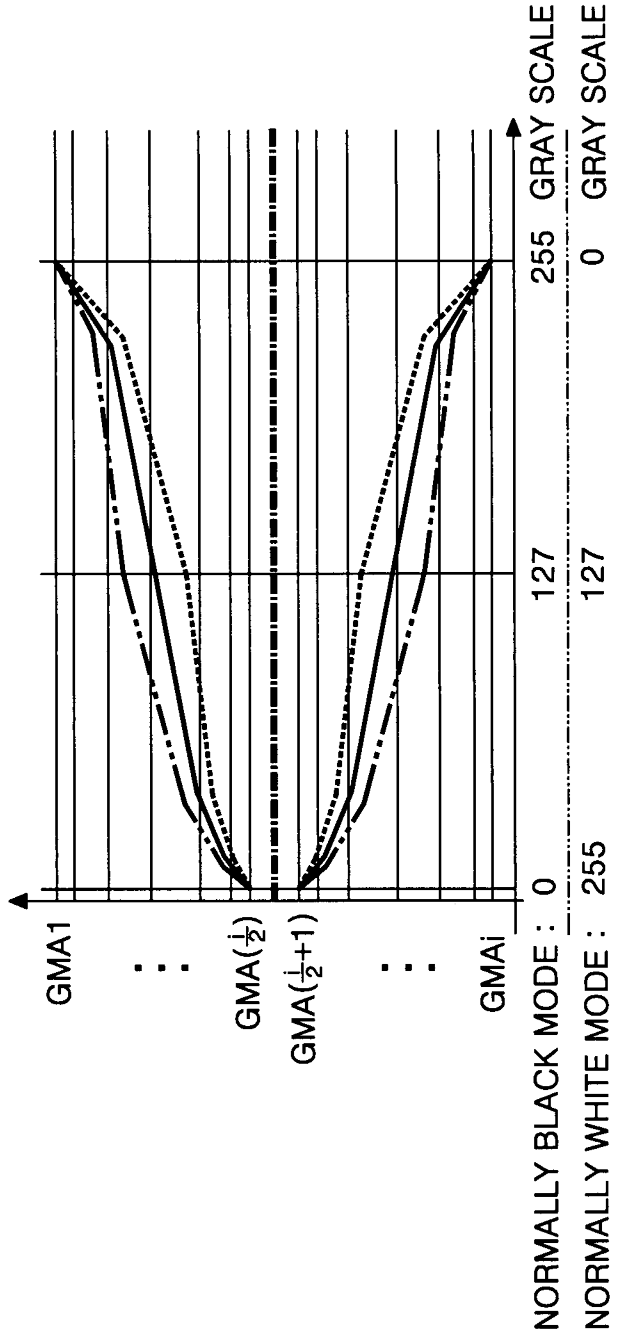
FIG. 11 is a diagram showing a characteristics of a gray scale inversion of the liquid crystal display according to the embodiment of the present invention.

A characteristics of a gray scale inversion which is realized for driving periods of a doubled odd numbered frame and a doubled even numbered will be described as shown in FIG. 11 in the case where the liquid crystal display according to the embodiment of the present invention swing gamma reference voltages as shown in FIG. 10.

In FIG. 11, a normally black mode is an operation mode that a screen is displayed with a black color in a normally state in which a voltage is not supplied to each pixel of the liquid crystal display panel 110, and a normally white mode is an operation mode that a screen is displayed with a white color in a normally state in which a voltage is not supplied to each pixel of the liquid crystal display panel 110.

Accordingly, in case of a normally black mode, a realized gray scale level goes higher as a level of a gamma reference voltage is increased at a high gray scale, while a realized gray scale level goes lower as a level of a gamma reference voltage is decreased at a low gray scale. On the contrary, in case of a normally white mode, a realized gray scale level goes lower as a level of a gamma reference voltage is increased at a high gray scale, while a realized gray scale level goes higher as a level of a gamma reference voltage is decreased at a low gray scale.

Figure 12:
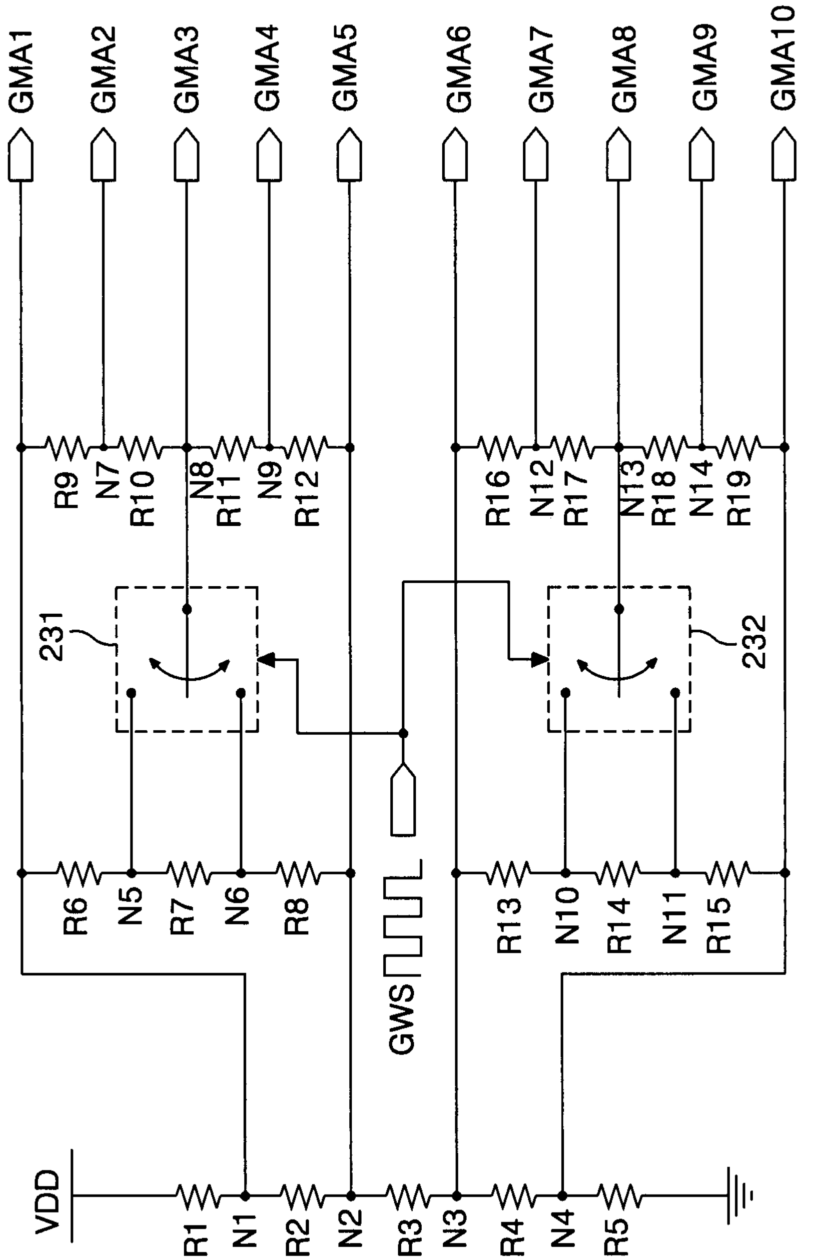
FIG. 12 is a circuit diagram showing another example of the gamma reference; voltage generator in FIG. 5.

FIG. 12 is a circuit diagram showing another example of the gamma reference voltage generator in FIG. 5.

Referring to FIG. 12, the gamma reference voltage generator 230 which is included in the liquid crystal display according to another embodiment of the present invention includes a plurality of resistors R1 to R19 and the switches 231 and 232, and the nodes N1 to N14 that generate a gamma reference voltage are located at the gamma reference voltage generator 230 similar to FIG. 7. However, the gamma reference voltage generator 230 which is included in the liquid crystal display according to another embodiment of the present invention does not include the inverter IV1.

Accordingly, a low level gamma swing control signal GWS or a high level gamma swing control signal GWS which is supplied from the timing controller 220 is simultaneously applied to the switches 231 and 232.

A method that the liquid crystal display which includes the gamma reference voltage generator having such configurations and functions according to another embodiment of the present invention swings a gamma reference voltage, will be described with reference to FIG. 13.

Figure 13:
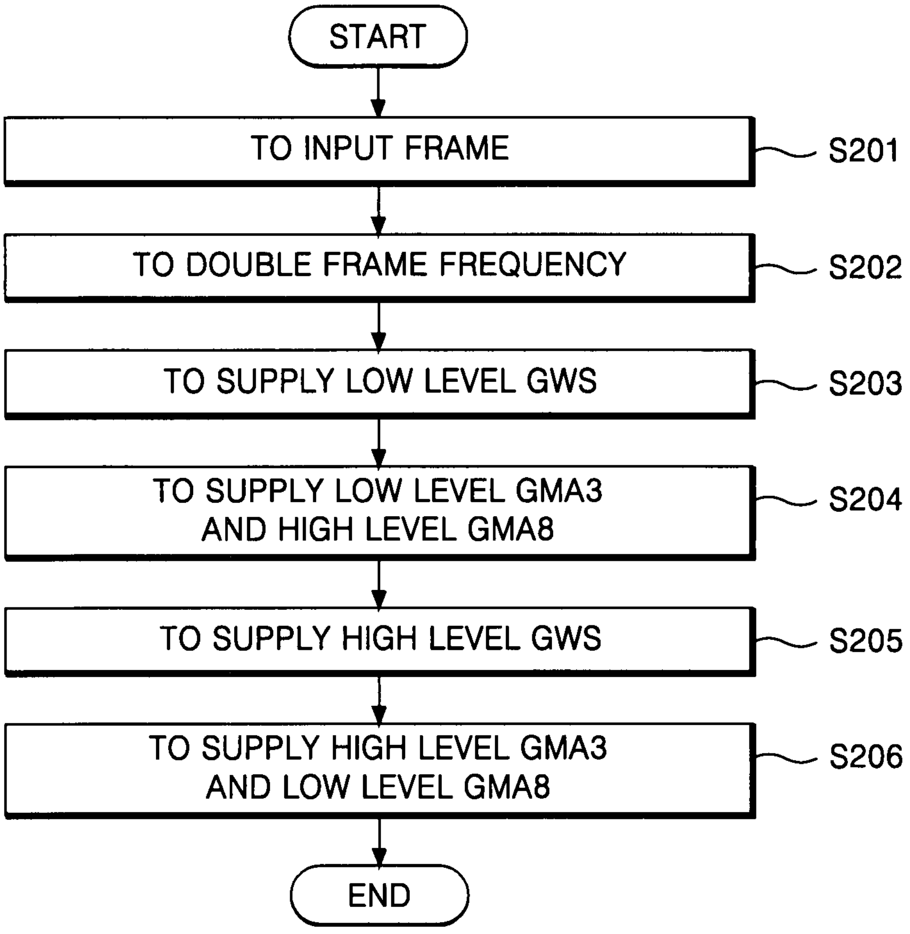
FIG. 13 is a flow chart showing a method of driving a liquid crystal display according to the embodiment of the present invention that includes the gamma reference voltage generator in FIG. 12.

FIG. 13 is a flow chart showing a method of supplying a gamma reference voltage of a liquid crystal display according to another embodiment of the present invention.

Referring to FIG. 13, if a frame is inputted from a system (S201), the frequency converter 210 doubles a frame frequency of an inputted frame to sequentially output a doubled odd numbered frame and a doubled even numbered frame to the timing controller 220 (S202). In this case, the timing controller 220 supplies a gamma swing control signal GWS having a low level to the switches 231 and 232 of the gamma reference voltage generator 230 for a driving period of a doubled odd numbered frame (S203).

Figure 14:
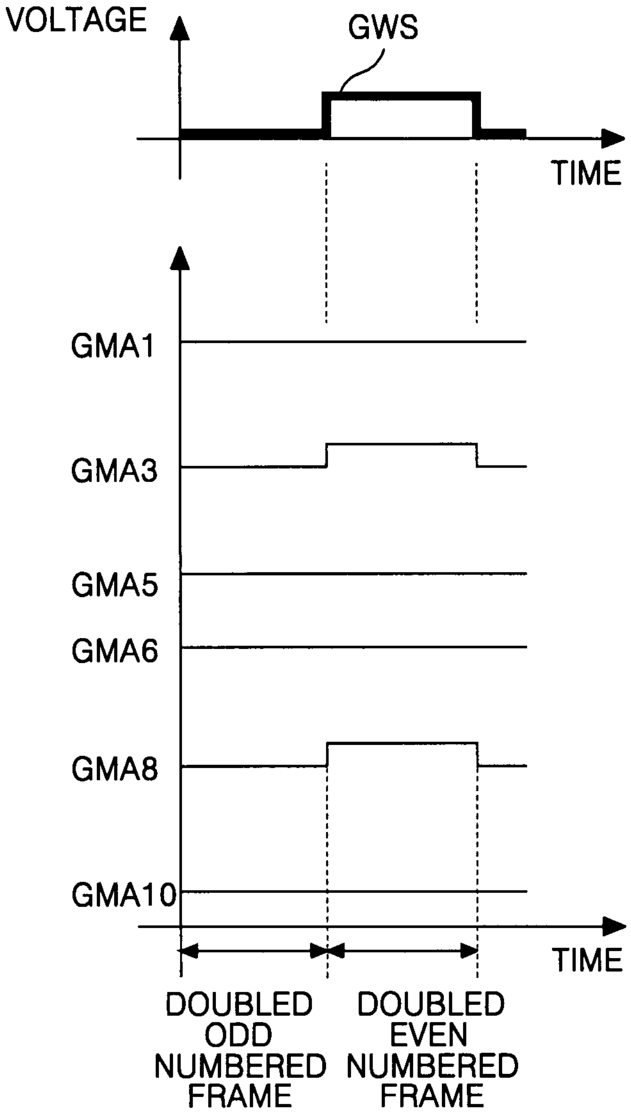
FIG. 14 is a diagram showing a characteristics of a gamma reference voltage which is outputted from the gamma reference voltage generator in FIG. 12.

For a driving period of a doubled odd numbered frame, the switch 231 is switched in the node N6 direction by a gamma swing control signal GWS having a low level to allow a gamma reference voltage GMA3 having a relative low level to supply to the data driver 240 as shown in FIG. 14. At the same time, the switch 232 is switched in the node N11 direction by a gamma swing control signal GWS having a low level to allow a gamma reference voltage GMA8 having a relative low level to supply to the data driver 240 as shown in FIG. 14 (S204).

If a driving period of a doubled odd numbered frame goes by, the timing controller 220 supplies a gamma swing control signal GWS having a high level to the switches 231 and 232 of the gamma reference voltage generator 230 for a driving period of a doubled even numbered frame (S205).

For a driving period of a doubled even numbered frame, the switch 231 is switched in the node N5 direction by a gamma swing control signal GWS having a high level to allow a gamma reference voltage GMA3 having a relative high level to supply to the data driver 240 as shown in FIG. 9. At the same time, the switch 232 is switched in the node N10 direction by a gamma swing control signal GWS having a high level to allow a gamma reference voltage GMA8 having a relative high level to supply to the data driver 240 as shown in FIG. 14 (S206).

A gamma reference voltage GMA3 that has a level between the highest-level gamma reference voltage GMA1 and a gamma reference voltage GMA5 having an intermediate gray scale level corresponds to a high gray scale level. On the contrary, a gamma reference voltage GMA8 that has a level between the lowest-level gamma reference voltage GMA10 and a gamma reference voltage GMA6 having an intermediate gray scale level corresponds to a low gray scale level.

In other words, the liquid crystal display according to another embodiment of the present invention relatively lowly swings levels of gamma reference voltages corresponding to a high gray scale and a low gray scale for a driving period of a doubled odd numbered frame, while the liquid crystal display according to another embodiment of the present invention relatively highly swings levels of gamma reference voltages corresponding to a high gray scale and a low gray scale for a driving period of a doubled even numbered frame.

In order to help a comprehension of the spirit of the present invention, in FIG. 12 and FIG. 14, the liquid crystal display of the present invention relatively lowly swings a level of a gamma reference voltage GMA3 corresponding to a high gray scale and, at the same time relatively highly swings a level of a gamma reference voltage GMA8 corresponding to a low gray scale for a driving period of a doubled odd numbered frame. On the contrary, the liquid crystal display of the present invention relatively highly swings a level of a gamma reference voltage GMA3 corresponding to a high gray scale and, at the same time relatively lowly swings a level of a gamma reference voltage GMA8 corresponding to a low gray scale for a driving period of a doubled even numbered frame.

Figure 15:
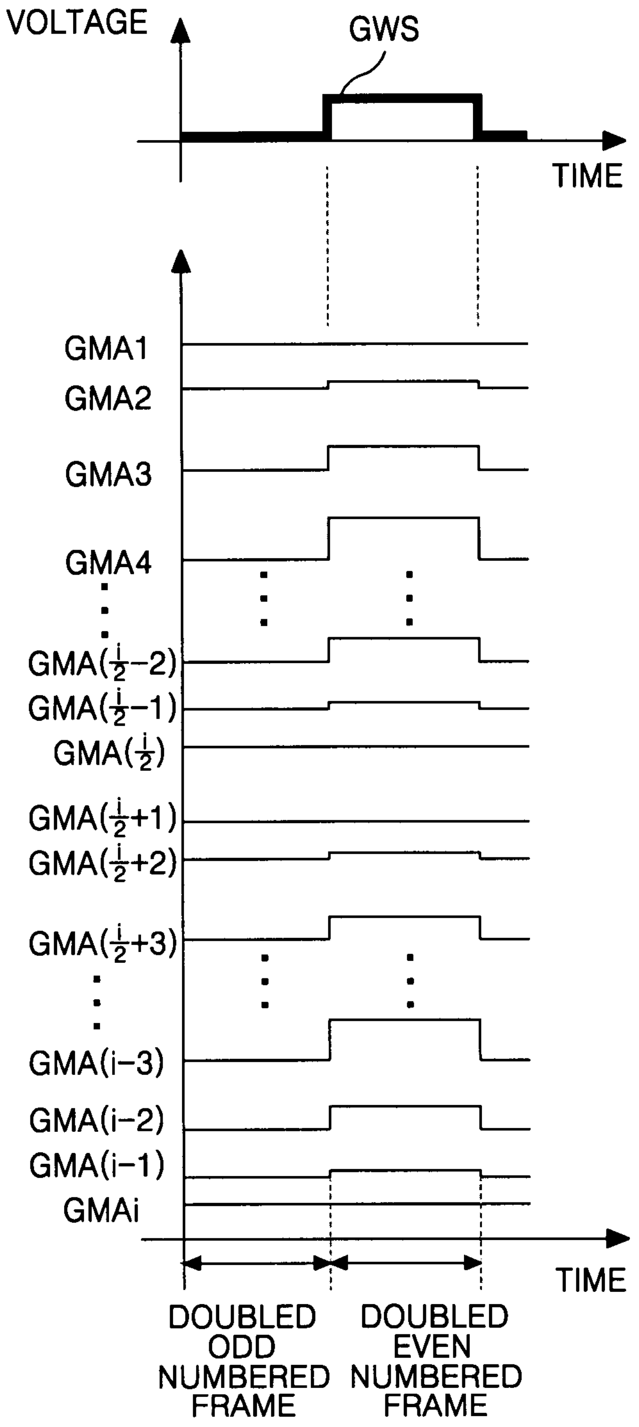
FIG. 15 is a diagram showing a characteristics of a gamma swing of the liquid crystal display according to another embodiment of the present invention.

More specifically, the liquid crystal display according to another embodiment of the present invention relatively lowly swings levels of gamma reference voltages GMA2 to GMA (i/2−1) corresponding to a high gray scale and, at the same time relatively lowly swings levels of gamma reference voltages GMA(i/2−1) to GMA(i−1) corresponding to a low gray scale for a driving period of a doubled odd numbered frame as shown in FIG. 15. On the contrary, the liquid crystal display according to another embodiment of the present invention relatively highly swings levels of gamma reference voltages GMA2 to GMA(i/2−1) corresponding to a high gray scale and, at the same time relatively highly swings levels of gamma reference voltages GMA(i/2−1) to GMA(i−1) corresponding to a low gray scale for a driving period of a doubled even numbered frame. Accordingly, the liquid crystal display according to another embodiment of the present invention improves a motion picture response time of the liquid crystal display which is driven with a doubled frame frequency to remove a flicker which is generated upon driving of a frame frequency.

However, the liquid crystal display according to another embodiment of the present invention does not swing the highest level gamma reference voltage GMA1, the lowest level gamma reference voltage GMAi, and gamma reference voltages GMA(i/2) and GMA(i/2+1) having an intermediate gray scale level.

Figure 16:
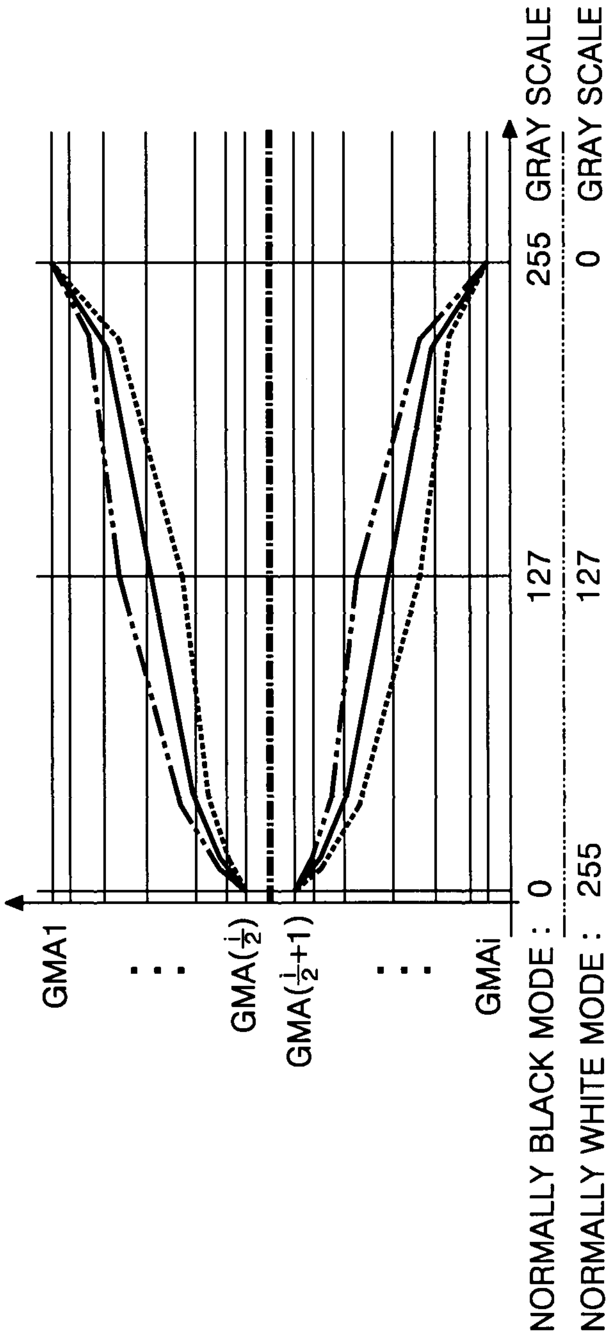
FIG. 16 is a diagram showing a characteristics of a gray scale inversion of the liquid crystal display according to another embodiment of the present invention.

A characteristics of a gray scale inversion which is realized for driving periods of a doubled odd numbered frame and a doubled even numbered will be described as shown in FIG. 16 in the case where the liquid crystal display according to the embodiment of the present invention swing gamma reference voltages as shown in FIG. 15.

In FIG. 16, in case of a normally black mode, a realized gray scale level goes higher as a level of a gamma reference voltage is increased at a high gray scale, while a realized gray scale level goes lower as a level of a gamma reference voltage is decreased at a low gray scale. On the contrary, in case of a normally white mode, a realized gray scale level goes lower as a level of a gamma reference voltage is increased at a high gray scale, while a realized gray scale level goes higher as a level of a gamma reference voltage is decreased at a low gray scale.

On the other hand, in the present invention, the timing controller 220 generates a gamma swing control signal GWS having a low level for a driving period of a doubled odd numbered frame and generates a gamma swing control signal GWS having a high level for a driving period of a doubled even numbered frame. However, the timing controller 220 of the present invention is not limited to this.

For another example, in the present invention, the timing controller 220 may generate a gamma swing control signal GWS having a high level for a driving period of a doubled odd numbered frame and may generate a gamma swing control signal GWS having a low level for a driving period of a doubled even numbered frame. In this case, a gamma swing operation of the gamma reference voltage generator 230 is inversely carried out compared to the above-mentioned case.

As described above, the present invention automatically adjusts a swing of a gamma reference voltage which is used for determining a gray scale level of a frame that is driven with a doubled frame frequency in real time to fast a motion picture response time of the liquid crystal display which is driven with a doubled frame frequency. As a result, the present invention removes a flicker which is generated by a driving of a frame frequency.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display, comprising:

a frequency converter that doubles a frame frequency of an input frame to generate a doubled odd numbered frame and a doubled even numbered frame;

a timing controller that generates a gamma swing control signal, which controls a swing of a gamma reference voltage that is used for determining gray scale levels of the doubled odd numbered frame and the doubled even numbered frame;

a gamma reference voltage generator that generates first gamma reference voltages having a different level corresponding to a high gray scale and second gamma reference voltages having a different level corresponding to a low gray scale, and the gamma reference voltage generator inversely swings the first gamma reference voltages of high gray scale and the second gamma reference voltages of low gray scale in accordance with the gamma swing control signal for a driving period of the doubled odd numbered frame and inversely swings the first gamma reference voltages of high gray scale and the second gamma reference voltages of low gray scale in accordance with the gamma swing control signal for a driving period of the doubled even numbered frame, and wherein the first gamma reference voltages of high gray scale and the second gamma reference voltages of low gray scale are inversely swung for driving periods of the doubled odd numbered frame and the doubled even numbered frame, wherein the gamma reference voltage generator includes a first switch that switching direction which is adjusted in accordance with a level of the gamma swing control signal from the timing controller, an inverter that inverts a level of the gamma swing control signal from the timing controller, a second switch that switching direction which is adjusted in accordance with a level of a gamma swing control signal which is inverted by the inverter, wherein the first and second gamma reference voltages are a voltage by which the a high-level power voltage and a ground voltage is dropped and divided by a plurality resistor, wherein the level of the first and second gamma reference voltages are swung by the gamma reference voltages which is switched via the first and second switch, wherein the timing controller supplies a gamma swing control signal having a low level to the gamma reference voltage generator for a driving period of the doubled odd numbered frame, and then supplies a gamma swing control signal having a high level to the gamma reference voltage generator for a driving period of the doubled even numbered frame, wherein the first gamma reference voltages are swung by the gamma reference voltages which is selectively output via the first switch, wherein the different low swing level of gamma reference voltages corresponding to a high gray scale, at the same time the second gamma reference voltages are swung by the gamma reference voltages which is selectively output via the second switch, wherein the different high swing level of gamma reference voltages corresponding to a low gray scale for the driving period of the doubled odd numbered frame, and wherein the first gamma reference voltages are swung by the gamma reference voltages which is selectively output via the first switch, wherein the different high swing level of gamma reference voltages corresponding to the high gray scale and, at the same time the second gamma reference voltages are swung by the gamma reference voltages which is selectively output via the second switch, wherein the different low swing level of gamma reference voltages corresponding to a low gray scale for the driving period of the doubled even numbered frame, wherein a level of the first gamma reference voltages are swung by the gamma reference voltages of two different levels which is switched via the first switch, and a levels of the second gamma reference voltages are swung by the gamma reference voltages of two different levels which is switched via the second switch, wherein the gamma reference voltages of two different levels which is switched via the first switch is dropped and divided by one of a first resistor, or wherein the gamma reference voltages of two different levels which is switched via the first switch is dropped and divided by one of a second resistor, wherein a realized gray scale level goes higher as a level of a gamma reference voltage is increased at a high gray scale, while a realized gray scale level goes lower as a level of a gamma reference voltage is decreased at a low gray scale, in a normally black mode.

2. The liquid crystal display according to claim 1, wherein the gamma reference voltage generator decreases levels of the first gamma reference voltages having a high gray scale in accordance with the gamma swing control signal having a low level that is directly supplied from the timing controller and, at the same time increases levels of the second gamma reference voltages having a low gray scale in accordance with a gamma swing control signal having a high level that is inverted by the inverter for a driving period of the doubled odd numbered frame.

3. The liquid crystal display according to claim 1, wherein the gamma reference voltage generator increases levels of the first gamma reference voltages having a high gray scale in accordance with the gamma swing control signal having a high level that is directly supplied from the timing controller and, at the same time decreases levels of the second gamma reference voltages having a low gray scale in accordance with a gamma swing control signal having a low level that is inverted by the inverter for a driving period of the doubled even numbered frame.

4. A method of driving a liquid crystal display, comprising:

doubling a frame frequency of an input frame to generate a doubled odd numbered frame and a doubled even numbered frame;

generating a gamma swing control signal which controls a swing of a gamma reference voltage that is used for determining gray scale levels of the doubled odd numbered frame and the doubled even numbered frame; and generating first gamma reference voltages having a different level corresponding to a high gray scale and second gamma reference voltages having a different level corresponding to a low gray scale, and wherein in the step of generating the gamma reference voltage, the first gamma reference voltages of high gray scale and the second gamma reference voltages of low gray scale are inversely swung in accordance with the gamma swing control signal for a driving period of the doubled odd numbered frame and the first gamma reference voltages of high gray scale and the second gamma reference voltages of low gray scale are inversely swung in accordance with the gamma swing control signal for a driving period of the doubled even numbered frame, and wherein the first gamma reference voltages of high gray scale and the second gamma reference voltages of low gray scale are inversely swung for driving periods of the doubled odd numbered frame and the doubled even numbered frame, wherein in the step of generating the gamma reference voltage, switching direction which is adjusted in accordance with a level of the gamma swing control signal from the timing controller using a first switch, inverting the gamma swing control signal from the timing controller using an inverter, switching direction which is adjusted in accordance with a level of a gamma swing control signal which is inverted by the inverter using a second switch, wherein the first and second gamma reference voltages are a voltage by which the a high-level power voltage and a ground voltage is dropped and divided by a plurality resistor, wherein the level of the gamma reference voltages are swung by a gamma reference voltages which is switched via the first and second switch, wherein the step of generating the gamma swing control signal generates a gamma swing control signal having a low level for a driving period of the doubled odd numbered frame, and then generates a gamma swing control signal having a high level for a driving period of the doubled even numbered frame, wherein the first gamma reference voltages are swung by the gamma reference voltages which is selectively output via the first switch, wherein the different low swing level of gamma reference voltages corresponding to a high gray scale, at the same time the second gamma reference voltages are swung by the gamma reference voltages which is selectively output via the second switch, wherein the different high swing level of gamma reference voltages corresponding to a low gray scale for the driving period of the doubled odd numbered frame, and wherein the first gamma reference voltages are swung by the gamma reference voltages which is selectively output via the first switch, wherein the different high swing level of gamma reference voltages corresponding to a high gray scale and, at the same time the second gamma reference voltages are swung by the gamma reference voltages which is selectively output via the second switch, wherein the different low swing level of gamma reference voltages corresponding to a low gray scale for the driving period of the doubled even numbered frame, wherein a level of the first gamma reference voltages are swung by the gamma reference voltages of two different levels which is switched via the first switch, and a level of the second gamma reference voltages are swung by the gamma reference voltages of two different levels which is switched via the second switch, wherein the gamma reference voltages of two different levels which is switched via the first switch is dropped and divided by one of a first resistor, or wherein the gamma reference voltages of two different levels which is switched via the first switch is dropped and divided by one of a second resistor, wherein a realized gray scale level goes higher as a level of a gamma reference voltage is increased at a high gray scale, while a realized gray scale level goes lower as a level of a gamma reference voltage is decreased at a low gray scale, in a normally black mode.

5. The method of driving the liquid crystal display according to claim 4, wherein the step of generating the gamma reference voltage decreases levels of the first gamma reference voltages having a high gray scale in accordance with the generated gamma swing control signal having a low level and, at the same time increases levels of the second gamma reference voltages having a low gray scale in accordance with a gamma swing control signal having a high level that the generated gamma swing control signal having a low level is inverted for a driving period of the doubled odd numbered frame.

6. The method of driving the liquid crystal display according to claim 4, wherein the step of generating the gamma reference voltage increases levels of the first gamma reference voltages having a high gray scale in accordance with the generated gamma swing control signal having a high level and, at the same time decreases levels of the second gamma reference voltages having a low gray scale in accordance with a gamma swing control signal having a low level that the generated gamma swing control signal having a high level is inverted for a driving period of the doubled even numbered frame.

* * * * *